June 6, 1961 H. L. IMELMANN 2,987,564

THERMOELECTRIC GENERATOR

Filed Feb. 25, 1958

INVENTOR.
Henry L. Imelmann

BY

Mason, Kolehmainen, Rathburn & Wyss
Attorneys.

United States Patent Office 2,987,564
Patented June 6, 1961

2,987,564

THERMOELECTRIC GENERATOR

Henry L. Imelmann, Arlington Heights, Ill., assignor to Thermo Power, Inc., Franklin Park, Ill., a corporation of Delaware Filed Feb. 25, 1958, Ser. No. 717,399
4 Claims. (Cl. 136—4)

The present invention relates to thermoelectric generators, and more particularly to a simple and compact apparatus for converting heat energy directly to electrical energy.

The present invention is in the nature of an improvement on the arrangements disclosed in my copending applications, Serial No. 377,766, filed September 1, 1953, now Patent No. 2,857,446, and Serial No. 534,943, filed September 19, 1955, now abandoned.

In these copending applications it has been pointed out that for well over a hundred years the phenomenon of thermoelectricity has been known, and ever since that time people have been working on improvements on thermoelectric generators for converting heat energy directly to electrical energy without the requirement of any movable parts. In recent years this search for an improved thermoelectric generator has greatly increased, and much research has been expended in that direction. There is a need, for example, in schools and laboratories for a simple and compact thermoelectric generator which will illustrate the phenomenon of thermoelectricity. Within the last year there has been a greatly increased emphasis on teaching science in all educational institutions, and the demand for a simple thermoelectric generator which can be utilized for teaching the phenomenon of thermoelectricity and which will produce useful output of electrical energy has greatly increased.

Accordingly, it is an object of the present invention to provide a new and improved thermoelectric generator.

It is another object of the present invention to provide a thermoelectric generator which is simple and compact, and which is well adapted for use in schools, laboratories and the like.

It is another object of the present invention to provide a simple and compact thermoelectric generator of sturdy construction which will give years of foolproof service.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing in which.

Briefly, the present invention comprises an insulating support in the form of a cup-shaped member preferably formed of molded insulating material, into the bottom of which are molded the so-called cold junctions of a plurality of thermoelectric elements. These elements are uniformly spaced and arranged so that the so-called hot junctions thereof are disposed in a common plane, also uniformly spaced to facilitate the heating problem. The cup-shaped support may serve as a container for a suitable medium for cooling the so-called cold junctions, if desired.

Figure 2:
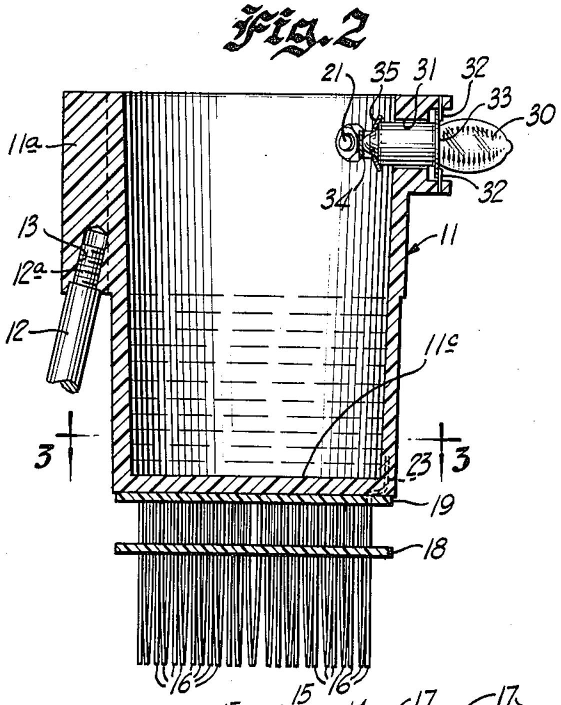
FIG. 2 is an enlarged sectional view taken on line 2—2 of FIG. 1.

Referring now to the drawing, the thermoelectric generator of the present invention is generally designated by the reference numeral 10 and comprises a cup-shaped insulating support 11, preferably molded from a suitable insulating material such as Bakelite or the like. As illustrated, the cup-shaped support is of circular cross section, but obviously it could have numerous other cross sections and the circular cross section is by way of example only. For the purpose of suitably supporting the insulating support 11, there are provided a plurality of legs 12 which may be secured to the insulating support 11 in any suitable manner. As illustrated, the insulating support 11 is provided with a plurality of integral protrusions 11*a*, each of which includes a tapped opening 13 at the lower end thereof, as best indicated in FIG. 2 of the drawing, for receiving the upper threaded end 12*a* of the supports or legs 12. Preferably, three legs or supports 12 are employed to provide a sort of tripod effect, although obviously more than three legs may be employed if desired.

To establish a voltage by the phenomenon of thermoelectricity, it is essential to provide two dissimilar materials joined together to define what is known as a hot junction. A single hot junction might be employed, or a plurality of hot junctions electrically interconnected either in series or parallel, or in combination thereof, dependent upon the desired voltage and current characteristics of the thermoelectric generator may be employed. It will be appreciated that if a single junction of relatively large thermoelectric elements is employed, a problem of heat absorption will arise and, accordingly, it is preferred to use a plurality of junctions spaced closely enough to provide a compact device, but far enough apart to insure good heat absorption.

In accordance with the present invention, therefore, a plurality of wirelike members 14 of one material are employed, each having one end thereof joined to a corresponding end of each of a plurality of wirelike members 15 of a dissimilar material to form a plurality of thermoelectric elements, each having a hot junction 16 at one end. The other ends of the members 14 and 15 may be connected in series or parallel with the other ends of adjacent thermoelectric elements to define so-called cold junctions 17. In a particular embodiment built in accordance with the present invention, the members 14 were formed of constantan, and the members 15 were formed of a nickel molybdenum alloy, comprising 91% nickel and 9% molybdenum, the nickel molybdenum alloy having about the same electrical resistance as constantan. It will be appreciated that if the thermoelectric elements, each having the hot junctions 16, are connected in series, the voltages produced by the respective junctions will add, so that the total voltage will be that of each junction multiplied by the number of junctions. Since for laboratory and teaching use a thermoelectric source of electricity having an output of the order of six volts is desirable, the thermoelectric elements, each comprising a member 14, a member 15, and a junction 16, are all connected in series by virtue of the cold junctions 17.

Figure 4:
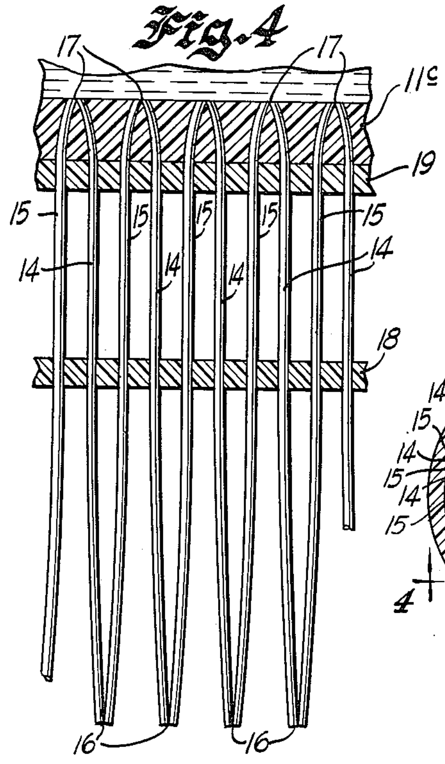
FIG. 4 is a greatly enlarged sectional view taken on line 4—4 of FIG. 3, assuming that FIG. 3 shows the complete structure.

In accordance with the present invention the ends of the cold junctions 17 of the thermoelectric elements are embedded in the bottom 11*c* of the insulating support 11, so that the extreme ends of the cold junctions 17 are just flush with the inside surface of the bottom and thus will be subjected to whatever medium is contained within the cup-shaped portion of the insulating support 11. For the purpose of supporting the thermoelectric elements defining the junctions 16 in spaced relationship, there are preferably provided a pair of insulating supporting disks 18 and 19. These supporting disks should be capable of withstanding relatively high temperatures, and are preferably formed of Fiberglas or a similar material. Actually, they are thin disks of material having a plurality of uniformly spaced openings, one for each of the wirelike members 14 and 15, thus holding these elements in assembled relationship. During the manufacturing process of the thermoelectric generator 10 of the present invention, the members 14 and 15 can be assembled to the spacer members 18 and 19, after which the junctions may be completed. It will be understood that the hot junctions 16, for example, can be completed before assembly with the supports or insulating disks 18 and 19. After such assembly the cold junctions 17 can be completed, so that all of the thermoelectric elements are connected in series to produce the maximum voltage. The assembly of completed elements and insulating disks 18 and 19 can then be disposed in a suitable molding apparatus, such as an injection molding machine, in a manner so that upon the molding of the housing 11 the cold junctions 17 will be embedded in the bottom 11*c* of the insulating support 11, as best indicated in FIG. 4 of the drawing. With this arrangement, since each thermoelectric element is identical, the hot junctions 16 will all be disposed in a common horizontal plane as viewed in FIG. 2 of the drawing, just as the cold junctions are in the plane of the inside surface of the bottom 11*c*.

Figure 1:
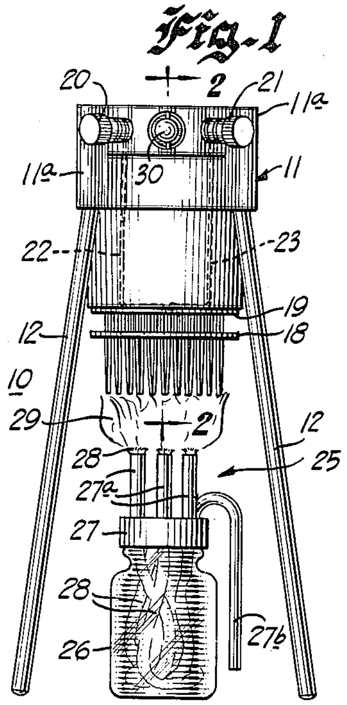
FIG. 1 is an elevational view of a thermoelectric generator of the present invention.

As illustrated in FIG. 1 of the drawing, output terminals 20 and 21 are suitably mounted on the insulating support 11, and these terminals are electrically connected by suitable conductors 22 and 23 with the serially arranged thermoelectric elements defining the junctions 16. In accordance with the present invention, the conductors 22 and 23 are molded within the walls of the insulating support 11 so that the device is completely foolproof and no possibility of interrupting the electrical circuit will occur.

Figure 5:
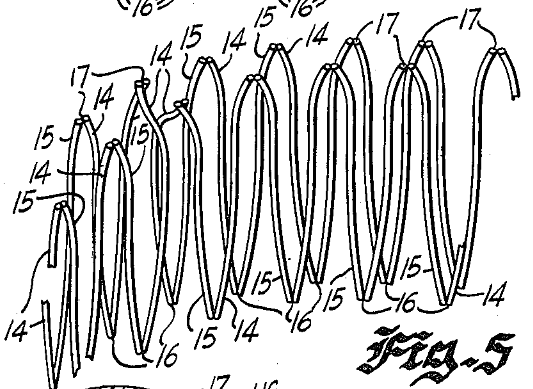
FIG. 5 is a perspective view of the thermoelectric elements of the present invention to illustrate an electrical connection thereof that may be used.
Figure 3:
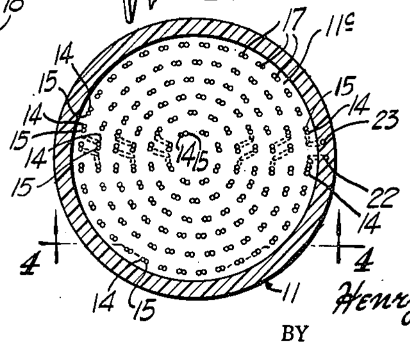
FIG. 3 is a sectional view taken on line 3—3 of FIG. 2, assuming that FIG. 2 shows the complete structure.

It will be appreciated that the plurality of elements may be arranged in numerous ways. Since the support 11 has been specifically illustrated as a circular or cylindrical support, the thermoelectric elements have been arranged in a series of concentric circles so that the hot and cold junctions are uniformly spaced in every direction. This is best shown in FIG. 3 of the drawing. So that the electrical connections can be completely embedded within the walls defining the insulating support 11, preferably conductors 22 and 23 are connected to adjacent members 14 and 15 in the outer circle of thermoelectric elements including the hot junctions 16, and the elements are then connected in series going back and forth through half of each circular row. This will readily be appreciated from an examination of FIGS. 3 and 5 of the drawing.

In an embodiment built in accordance with the present invention, the members 14 and 15 were each one and a half inches in length and formed of circular cross section wire .020 of an inch in diameter. The insulating support 11 had an exterior diameter adjacent the bottom thereof of the order of two inches, and one hundred forty-five junctions were arranged in a uniformly spaced manner, as clearly shown in FIG. 3 of the drawing, in this area. An output voltage of the order of six volts is obtained when these elements are heated by an ordinary flame of combustion, such as that produced by an alcohol lamp or a similar source of heat.

As illustrated in FIG. 1 of the drawing, a source of heat generally designated at 25 may be employed. It should be appreciated that the illustrated source of heat is by way of example only. As there illustrated, an alcohol lamp comprising a container 26 and a cover 27 is provided, which cover has tubular extensions 27*a* for accommodating suitable wicks 28, one in each tube. An air supply tube 27*b* is also associated with the cover to insure atmospheric pressure within the container 26. Such an alcohol lamp, when lit, will produce a low flame, as indicated at 29, which is uniformly distributed over the plane within which the hot junctions 16 are disposed and which will produce uniform heating thereof.

If desired, the load for the generator may comprise a suitable lamp 30 which may be mounted on support 11. As illustrated, the insulating support 11 is provided with an opening 31 for accommodating the lamp. Suitable pins 32 may engage a flange 33 defined on the lamp to hold the lamp in position. Electrical connections with the lamp may be completed by suitable spring type conductors 34 and 35 connecting the lamp across the terminals 20 and 21. If desired, the lamp 30 may also be used as an indicating lamp, indicating that a voltage appears across the terminals 20 and 21.

Preferably, the insulating support 11 is filled to a predetermined level with a medium such as water and, as illustrated, the exterior of the support 11 is provided with an annular shoulder which is positioned so as to define the water level to be maintained in the cup-shaped insulating support 11. If desired, suitable insulating indicia may be applied to the exterior of the support 11, indicating that the shoulder represents the recommended water level.

In view of the detailed description included above, the operation of the present invention will readily be understood by those skilled in the art. When it is desired to produce an electrical output, the insulating support 11 is filled with water to the level designated by the shoulder 11*c*, and then the source of heat is rendered effective to heat the hot junctions 16. Heating of these hot junctions 16 will cause a voltage to be produced across the output terminals 20 and 21 which may be connected to any suitable circuit.

Although there has been illustrated and described but a single embodiment of the present invention, it will be understood by those skilled in the art that numerous changes and modifications are possible and are likely to occur to those skilled in the art. It is intended in the appended claims to cover all those changes and modifications that fall within the true spirit and scope of the present invention.

What is claimed as new and desired to be secured by Letters Patent of the United States is:

1. In a thermoelectric generator for converting heat energy directly to electrical energy the combination of, a cup-shaped insulating support, a plurality of elements each comprising two dissimilar materials having adjacent ends connected together to form a hot junction, insulating means independent of said support for holding said plurality of elements in spaced relationship with all of said junctions disposed in a common plane outside said cup-shaped insulating support, the ends of all of said elements remote from said junctions extending into one wall of said insulating support, means for interconnecting said elements in an electric circuit, a pair of terminals mounted on said support, and means for connecting said electric circuit between said terminals.

2. A thermoelectric generator for converting heat energy directly to electrical energy comprising, a cup-shaped support of insulating material having a bottom integrally formed with the sides of said cup-shaped support, a plurality of pairs of elements each comprising two dissimilar materials having adjacent ends connected together to form a hot junction, the ends of all of said pairs of elements remote from the junctions extending into the bottom of said cup-shaped support so as to be substantially flush with the inside of the bottom and exposed to the interior of said support, said pairs of elements being supported in the bottom of said support so that said junctions are all disposed in a common plane, means in said bottom for connecting said pairs of elements in an electric circuit, a pair of terminals mounted on said support, and means for connecting said electric circuit between said terminals.

3. The generator of claim 1 wherein said elements comprise thin wirelike members, and said insulating means comprises a plate having a plurality of spaced openings therein, one for each of said wirelike members.

4. A thermoelectric generator for converting heat energy directly to electrical energy comprising, a cylindrical cup-shaped vessel of insulating material having a bottom integrally formed with the sides of said vessel, a plurality of thermoelectric elements each comprising two dissimilar wirelike members having adjacent ends connected together to form a hot junction, the ends of all of said elements remote from said junctions extending into the bottom of said vessel so as to be substantially flush with the inside of said bottom and exposed to the interior of said vessel, said elements being supported in the bottom of said vessel so that said junctions are all dispoed in a common plane, means in said bottom for connecting said pairs of elements in an electric circuit, a pair of terminals mounted on said support, and means for connecting said electric circuit between said terminals.

References Cited in the file of this patent

UNITED STATES PATENTS

| | | |
|---|---|---|
| 1,666,919 | Steurer | Apr. 24, 1928 |
| 2,456,070 | Malek et al. | Dec. 14, 1948 |
| 2,530,254 | Malek | Nov. 14, 1950 |
| 2,844,638 | Lindenblad | July 22, 1958 |

FOREIGN PATENTS

| | | |
|---|---|---|
| 9,741 | Great Britain | Nov. 25, 1843 |
| 13,715 | Great Britain | June 8, 1911 |